Aug. 14, 1945.  G. HAGEDORN  2,382,711
DEVICE FOR ELECTRIC RESISTANCE WELDING
Filed Feb. 11, 1941  2 Sheets-Sheet 1

Inventor,
Gerhard Hagedorn
By: Glascock Downing & Seebold, Attorneys.

Aug. 14, 1945.  G. HAGEDORN  2,382,711
DEVICE FOR ELECTRIC RESISTANCE WELDING
Filed Feb. 11, 1941  2 Sheets-Sheet 2

Inventor,
Gerhard Hagedorn
By: Glascock Downing & Seebold
Attorneys

Patented Aug. 14, 1945

2,382,711

UNITED STATES PATENT OFFICE 2,382,711

DEVICE FOR ELECTRIC RESISTANCE WELDING

Gerhard Hagedorn, Berlin-Lichterfelde-West, Germany; vested in the Alien Property Custodian Application February 11, 1941, Serial No. 378,465
In Germany January 11, 1940

2 Claims. (Cl. 219—4)

The present invention relates to welding apparatus and more particularly pertains to electric resistance welding devices wherein means is provided for neutralizing the forces tending to move the electrodes from the material being welded.

It is known that resistance welding machines, in particular spot welding machines for light metals, carry considerable currents in the secondary circuit of the welding transformer. It has been noted, in particular in the case of light metal welding, that by these heavy currents harmful electro-dynamic forces are generated with the result that the electrodes are lifted off the work parts, though often only to a slight degree, the contacting pressure of the electrodes is reduced sufficient to rapidly impair the electrode area and the work parts area in consequence of the development of too intense heat of the welding current, caused by increased contact resistance. This not only endangers the corrosion resisting quality of the welding, but also necessitates frequent replacing of the electrodes, considerably reducing the operating speed thereby. In the past efforts have been made to counteract such harmful forces by employing elastic means, but satisfactory results could not be obtained thereby. It has further been tried to avoid such disadvantages by making use of excessively strong contact pressures. This showed, however, that strong contact pressures entailed an extraordinary increase of the current intensity, which also had a disadvantageous effect inasmuch as the lifting off forces also showed an increase. The lifting off effect is of course diminished by the high pressure, but cannot be eliminated thereby. It is quite immaterial in this connection, whether the pressure is caused by a spring or any other pressing agent. The electro-dynamic force will continue to act, resulting in a lesser or greater lifting force for the electrode. These disadvantages are eliminated by the present invention.

The invention pertains to apparatus for electrical resistance welding, characterized by the fact that for the neutralization of the electromagnetic current forces, occurring in the secondary circuit of the welding transformer and causing the lifting off of the electrodes from the work parts, there are simultaneously generated additional electro-magnetic forces acting in the direction of the electrode pressure, compensating or overcompensating the lifting off forces. The additional electro-dynamic forces are advantageously generated by the secondary current of the welding transformer itself. But the additional electro-dynamic forces may also be generated by the primary current of the welding transformer or the source of the welding current. If the electro-dynamic forces are to be generated by the secondary current itself, the electrodes are advantageously arranged in such a manner that the electro-dynamic forces occurring in welding will press the electrodes to the work parts. In that case the elastic electrode holders, with reference to the secondary current loop, are preferably arranged obliquely toward the inside. With double-spot welding the electrode holders are also arranged obliquely toward the inside, and slidably supported at their free ends. In the case of single-spot welding an advantageous arrangement will also consist of connecting one of the electrodes with the movable part of an electro-magnet which might be fed by the current source of the welding transformer.

The invention will be more fully understood upon reference to the annexed drawings and the following detailed description wherein several exemplary embodiments of the invention are disclosed.

Figure 1:
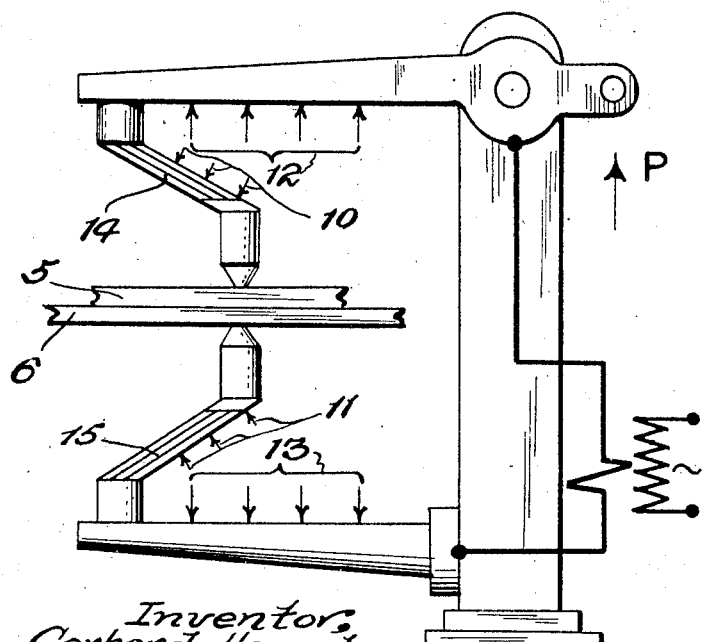
Fig. 1 is a side elevational view of welding apparatus embodying the invention.

Figure 1 represents a single-spot welding device in which the additional electro-dynamic forces 10, 11 are generated by the secondary current of the welding transformer itself, said forces counteracting the lifting off forces 12, 13 and increasing the welding pressure P at the moment of the current impulse. The electrodes in this case are arranged in such a manner that the electro-dynamic forces, occurring in the welding operation, press the electrodes to the work parts 5, 6, this being effected, for example, by having the elastic electrode holders 14, 15, forming parts of the secondary current loop, arranged obliquely toward the inside of the secondary loop.

Figure 2:
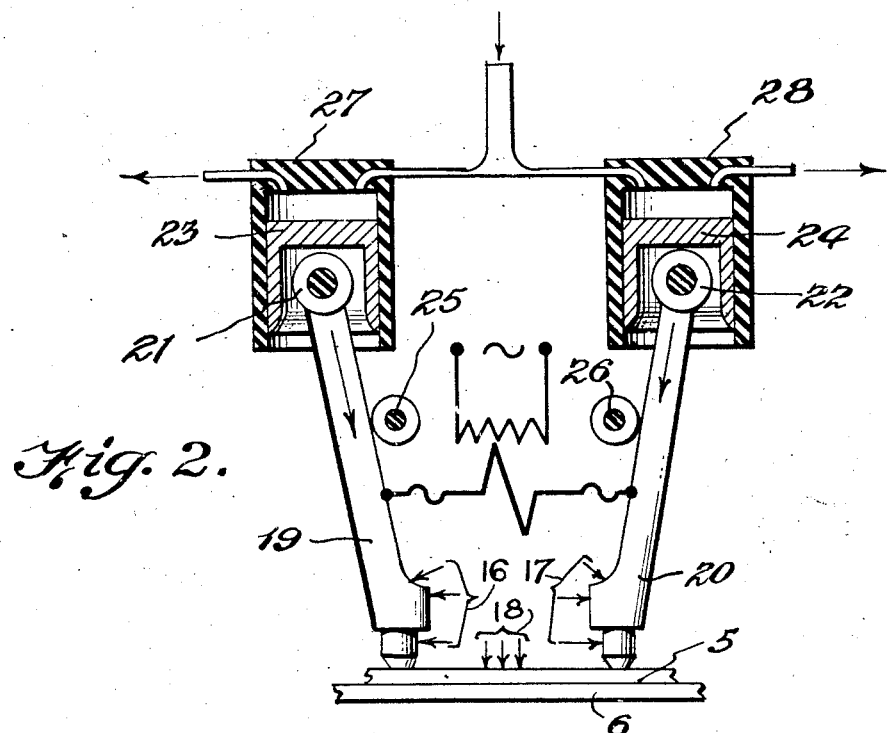
Fig. 2 is an elevational view partly in section illustrating a modification.

Figure 2 represents a double-spot welding device wherein additional electro-dynamic forces 16, 17 are also generated by the secondary current of the welding transformer itself, said forces counteracting the lifting off forces 18 and increasing the welding pressure at the moment of the current impulse. The electrode holders 19, 20 in this case are arranged obliquely toward the inside and with their free ends 21, 22 slidably supported, for example, by means of the plungers 23, 24 in such a manner that the electro-dynamic forces 16, 17 press the electrodes to the work parts 5, 6. The electrodes and the electrode holders are in this instance preferably designed as small as possible. The movement of the electrode holders 19, 20 toward the inside is checked by stops 25, 26, offering but slight frictional resistance. When moving toward the outside each electrode may rotate around a pin of the compressed air plunger sliding in the compressed air cylinders 27, 28, the contacting pressure being generated by the said compressed air plunger. Hence, the electrodes may yield to the action of the electro-dynamic forces and firmly press upon the work parts.

Figure 3:
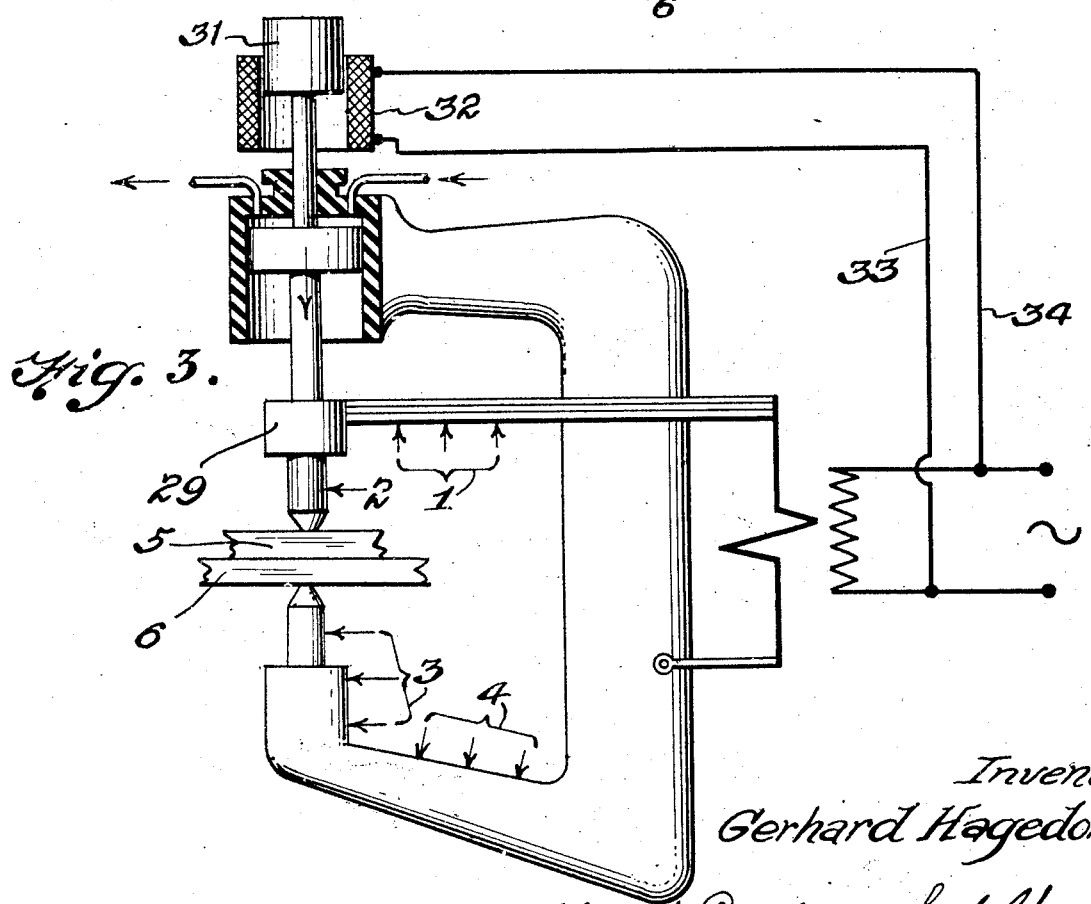
Fig. 3 is a side elevational view partly in section showing a further modification and a control circuit therefor.

Figure 3 represents a further single-spot welding device with compensation of the lifting off forces. Upon the upper electrode holder 29 acts, in addition to the compressed air plunger, an electro-magnet provided with a movable iron core 31 and a fixed coil 32, whose excitation may originate from the welding current source during the time of flow of the welding current. The coil 32 of the electro-magnet is fed by way of the leads 33, 34. With this device it will be possible to compensate or overcompensate the lifting off forces.

What is claimed is:

1. In an electric welding apparatus, at least two substantially rigid conducting arms, an electrode for and electrically connected to each of said arms, said electrodes being adapted to engage work pieces to be welded, all forming parts of an electrical circuit for supplying current to said work pieces, means attached to said arms for flexibly supporting and moving said electrodes individually in a yielding engagement with said work pieces, each of said flexible supporting means forming an acute angle with respect to its supporting arm with the result that the magnetic flux set up by the current flowing in said flexible supporting means reacts with the flux set up by the current flowing in its supporting arms to move said electrodes by flexing their flexible supporting means towards the work pieces, whereby the pressure of said electrodes upon the work pieces is increased by electromagnetic reaction.

2. In electric welding apparatus, a fixed electrically conductive arm arranged substantially parallel to the material to be welded, a pivotal electrically conductive arm mounted to move towards and away from the material to be welded said arms being substantially rigid, an electrode including a flexible portion carried by the fixed arm and arranged at an acute angle with respect thereto for engaging the material to be welded, a second electrode including a flexible portion portion carried by the pivotal arm and arranged at an acute angle with respect thereto for engaging the material to be welded, and means supplying current to said arms forming an electrical circuit through the material to be welded and through said arms and said electrodes including the flexible portions thereof whereby the magnetic flux set up by the current flowing in the flexible portions of the electrodes reacts with the magnetic flux produced by the current flowing in said arms to force the electrodes towards the material to be welded.

GERHARD HAGEDORN.